3,214,445
DERIVATIVES OF (OXYPHENOXY)-PHENYL-
AMINO DIHYDROXY-ANTHRAQUINONE
Peter Hindermann, Basel, Hans Peter Kölliker, Munchenstein, Basel-Land, and Alfred Staub, Binningen, near Basel, Switzerland, assignors to J. R. Geigy A.-G., Basel, Switzerland
No Drawing. Filed Apr. 22, 1963, Ser. No. 274,779
Claims priority, application Switzerland, Apr. 26, 1962, 5,026/62; July 24, 1962, 8,908/62
6 Claims. (Cl. 260—380)

The present invention concerns substituted dihydroxyphenylamino-anthraquinones, processes for the production thereof, dyeing processes using these new anthraquinone dyestuffs, as well as, as industrial product, the material fast-dyed with the aid of these dyestuffs.

The known 1-phenylamino-4-hydroxy-anthraquinone dyestuffs which have been used in the dyeing of acetate rayon are often not satisfactory for the dyeing of polyester fibers because of their inferior drawing power on the latter fibers, and the lack of fastness to light and to sublimation of the resulting colored fibers.

It is, therefore, an important object of the invention to provide 1-phenylamino-4-hydroxy-anthraquinone dyes which draw well especially on polyester fibers and afford colored materials which are distinguished by good fastness, particularly to sublimation.

According to a first, preferred, aspect of the invention, it has been found that dihydroxy-phenylamino-anthraquinone of formula

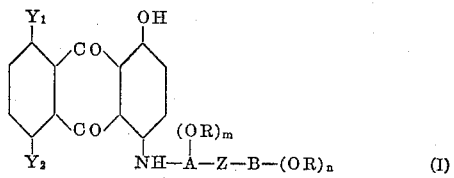

(I)

wherein of $Y_1$ and $Y_2$ one Y is the hydroxyl group and the other Y is the nitro, amino, mono-lower alkylamino or mono-hydroxy-lower alkylamino group,
each of A and B is a phenylene radical at least one of which is substituted with an —OR group and either one or both of which can contain further substituents, which do not dissociate acid in water, defined further below,
Z represents oxygen or sulfur,
R represents hydrogen or a lower alkyl group, and
each of $m$ and $n$ represents independently one of the integers 0, 1 or 2, the sum total of $m$ and $n$ being at least one and not more than 3 and the member of —OR groups in which R is hydrogen not exceeding 2, allow attainment of the above-stated object satisfactorily. These novel dyestuffs which are difficultly soluble in water, are obtained by reacting a dinitrodihydroxy-anthraquinone of formula

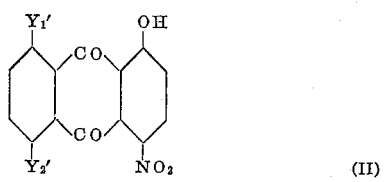

(II)

with an amine of formula

(III)

to form an anthraquinone dyestuff of formula

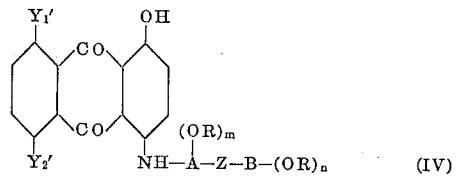

(IV)

wherein in the Formulae II and IV, of $Y_1'$ and $Y_2'$, one is the hydroxyl group and the other is the nitro group and in Formulae III and IV, A, B, Z, R and $n$ have the meanings given in Formula I and either reducing the nitro group in Formula IV symbolized by $Y_1'$ or $Y_2'$ to the amino group or exchanging it by heating with a mono-lower alkyl-amine or mono hydroxy-lower alkyl-amine for a mono-lower alkyl amino or mono hydroxy-lower alkyl amino group.

Compared with similar known compounds which do not contain an —OR group, the advantage of the new compounds lies in their better drawing power onto polyester fibers. Also, more level dyeings are obtained. Additional advantages of the dyestuffs according to the invention having a free hydroxyl group as OR are the better dispersibility and the excellent fastness to sublimation of the dyeings attained therewith.

Dinitrodihydroxy-anthraquinones usable according to the invention as starting materials can be of the 1,5-dihydroxy-anthraquinone series (anthrarufin) or 1,8-dihydroxy-anthraquinone series (chrysazin); often it is advantageous also to use mixtures of these isomers in the process according to the invention.

Amines usable according to the invention should not contain any substitutents which dissociate acid in water such as sulfonic acid or carboxylic acid groups. In one of the phenylene radicals A or B the substituent —OR can occur once or twice while the other phenylene radical remains free from —OR, or it can occur once in both phenylene radicals A and B or once in one and twice in the other phenylene radical. R advantageously represents hydrogen or also a lower alkyl group in which case it is, in particular, the methyl group. The phenylene radicals A and B taken together can contain a total of from one to maximally four further substituents, for example, lower alkyl groups such as methyl, ethyl, propyl, butyl, the nitro group, the amino group, acylamino groups, especially lower alkanoylamino such as acetylamino, propionylamino or butyrylamino, chloro- or bromo-lower alkanoyl amino groups such as chloroacetylamino or β-chloropropionylamino, benzoylamino, lower alkyl sulfonylamino such as methylsulfonylamino or chloromethylsulfonylamino, mono- or di-chlorotriazinylamino, 2,4-di or 2,4,5-tri-chloropyrimidyl-(6)-amino groups or halogen atoms of atom numbers 9 to 35 inclusive such as fluorine, bromine or chlorine.

Preferred compounds according to the invention are those obtained from amines in which phenylene radicals A and B, respectively, are substituted only with the —OR radical or radicals, and those further substituted with lower alkyl, bromine or chlorine. Optimal results in the dyeing of polyester fibers are obtained with dyestuffs of the formula.

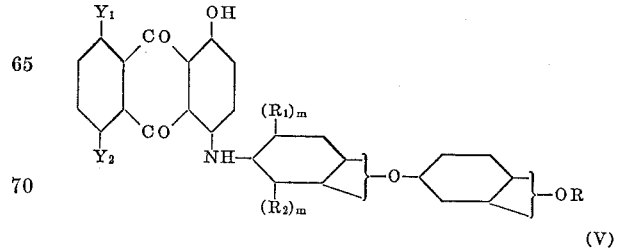

(V)

wherein one of $Y_1$ and $Y_2$ is hydroxyl and the other is nitro, $R_1$ and $R_2$ are both lower alkyl, preferably $R_1$ being equal to $R_2$, R is either hydrogen or methyl and $m$ is either 0 or 1. The drawing power on polyester fibers, and the fastness, in particular to light, sublimation and wet treatment of the resulting colored products, are excellent.

Some of these additional substituents in the phenylene radicals A and B can be introduced also after condensation to form the anthraquinone dyestuff, for example, by aftertreatment with a halogenating agent such as chlorine or bromine or sulfuryl chloride, or by nitrating after the condensation and optional reduction of the nitro compound to the amino compound followed by acylation of the amino group.

Amines used in preparing preferred compounds according to the invention are derived, for example, from the following ethers:

4-amino-4'-hydroxy-diphenyl ether,
3-amino-4'-hydroxy-diphenylether,
2-amino-4-'-hydroxy-diphenyl ether,
4-amino-3,5-dimethyl-4'-hydroxy-diphenyl ether,
4-amino-3,5-dimethoxy-4'-hydroxy-diphenyl ether,
4-amino-3'-hydroxy-diphenyl ether,
4-amino-2'-hydroxy-diphenyl ether,
4-amino-2-hydroxy-diphenyl ether,
4-amino-2'- or 4-amino-4'-methoxy-diphenyl ether,
4-amino-3-methyl-4'-methoxy-diphenyl ether,
3-amino-3'-hydroxy-diphenyl ether,
3-amino-3'-methoxy-diphenyl ether,
3-amino-2,4-dimethyl-4'-hydroxy-diphenyl ether,
3-amino-4'-methoxy-diphenyl ether,
3-amino-6-methoxy-diphenyl ether,
3-amino-2,5-dimethyl-4'-methoxy-diphenyl ether,
2-amino-4'-hydroxy-diphenyl ether,
2-amino-4'-methoxy-diphenyl ether,
2-amino-4-methoxy-diphenyl ether,
2-amino-3,5-dimethyl-4'-hydroxy-diphenyl ether,
2-amino-4,3'-dihydroxy-diphenyl ether,
4-amino-4'-hydroxy-diphenyl sulfide,
4-amino-3,5-dimethyl-4'-methoxy-diphenyl sulfide,
2-amino-3,5-dimethyl-4'-hydroxy-diphenyl sulfide,
4-amino-3,5-diethyl-4'-methoxy-diphenyl ether,
4-amino-3-ethyl-3'-hydroxy-diphenyl ether,
4-amino-3-chloro-4'-hydroxy-diphenyl ether,
3-amino-6-isopropyl-4'-methoxy-diphenyl ether,
2-amino-4-methoxy-4'-tert-butyl-diphenyl ether,
4-amino-3-methyl-4'-bromo-2'-methoxy-diphenyl ether,
3-amino-6-isopropyl-2'-methoxy-diphenyl ether,
4-amino-2-methoxy-4'-tert-butyl-diphenyl ether,
3-amino-3'-chloro-4'-methoxy-diphenyl ether and
4-amino-4'-bromo-2'-methoxy-diphenyl ether.

Those amines with one —OR substituent, and preferably —OH, in the phenyl ring B lead to a preferred class of compounds within the scope of Formula I comprising those of Formula V.

Amines usable according to the invention are obtained, for example by condensing o- or p-nitrochlorobenzene with alkoxyphenols or alkoxythiophenols to form the corresponding nitroalkoxydi-phenyl ethers or -thioethers and then reducing the nitro group to the amino group, or also by condensing m-bromo-aniline with alkoxyphenol or alkoxythiophenol in the presence of copper. Hydroxyl-substituted aminodiphenyl ethers or thioethers are obtained from the corresponding alkoxy compounds by dealkylation of the alkoxy groups, advantageously with hydrobromic acid.

"Lower" as used in this specification and in the appended claims in connection with an aliphatic radical means that the said radical has from 1 to 4 carbon atoms.

The reaction of the dinitro-dihydroxy-anthraquinones of Formula II with the amines of Formula III is performed with an excess of amine in the melt at 100–200° C., advantageously however, in the presence of an inert organic solvent boiling at 120–200° C. such as, e.g. butanol, glycol monoethyl ether, dimethyl formamide, or preferably; in the presence of a preferably substituted hydrocarbon such as chlorobenzene, dichlorobenzene and, particularly, nitrobenzene.

The new nitro-dihydroxy-phenylamino-anthraquinones of Formula IV generally crystallize from the reaction mixture and are gained by filtration, dilution of the mixture with water or removal of the organic solvent by steam distillation. They can be purified by recrystallization. If desired, the nitro group is reduced to the amino group, e.g. with glucose in aqueous-alkaline solution or preferably with sodium sulfide in aqueous or aqueous-organic medium, in particular in a mixture of water and pyridine. The nitro group can also be replaced by an alkylamino group by heating with an alkylamine, such as, particularly, methylamine, ethylamino or β-hydroxyethyl amine. However, the nitro group is preferred as one of the substituents $Y_1$ and $Y_2$.

In a pure state, the new dyestuffs of Formula I are bronzy crystalline deeply colored substances. They dissolve in hot organic solvents with a pure blue shade.

The dyestuffs according to the invention are suitable for the dyeing of hydrophobic synthetic textile fibers from aqueous dispersion, e.g. for the dyeing of cellulose di- to tri-acetate, particularly however for the dyeing of high molecular esters of aromatic polycarboxylic acids with polyfunctional alcohols, e.g. of polyglycol terephthalates such as "Terylene" of Imperial Chemical Industries, Manchester; "Dacron" of E. I. du Pont de Nemours & Co., Wilmington, Delaware, U.S.A.; of "Tergal" of Rhodiaceta, Lyons; of "Trevira" of Farbwerke Hoechst, Frankfurt am Main; "Terital" of Rhodiatoce, Milan, or "Kodel" of Eastman Chemicals Kodak Ind., Kinsport, Tenn., U.S.A. The dyestuffs can also be used for the dyeing of synthetic polyamide fibers such as "nylon" of du Pont de Nemours & Co., Wilmington, Delaware, U.S.A., or "Perlon" of Farbenfabriken Bayer in Leverkusen, Germany.

The dyestuffs according to the invention can also be used for the dyeing of lacquers and spinning masses.

Polyester fibers are dyed with aqueous dispersions of the dyestuffs according to the invention advantageously at temperatures of over 100° C., preferably 120 to 140° C. under sufficient excess pressure to attain the aforesaid temperatures. Very good dyeings are also obtained by impregnating polyester fibers with concentrated aqueous dispersions of dyestuffs according to the invention, squeezing out and drying the fabric and then fixing at temperatures of 180–250° C. Dyeing can also be performed, however, at the boiling point of the dyebath in the presence, in the bath, of carriers for the dyestuffs such as, e.g. phenylphenol, polychlorobenzene compounds or similar auxiliaries.

The dyestuffs according to the invention are distinguished by their excellent drawing power in particular on polyester fibers. The drawing power of these dyestuffs can be further improved by mixing several, preferably two anthraquinone dyestuffs according to the invention with each other, preferably in a ratio of 1:5 to 1:1. The blue dyeings attained on polyester fibers have very good wet fastness, sublimation and light fastness properties.

The following examples illustrate the invention. Where not otherwise expressly stated, parts are given as parts by weight. The temperatures are in degrees centigrade. The relationship of parts by weight to parts by volume is as that of grams to cubic centimeters.

EXAMPLE 1

33 parts of 1,5-dihydroxy-4,8-dinitroanthraquinone are mixed with 60.3 parts of 4-amino-4'-hydroxy-diphenyl ether. The mixture is added to 350 parts of 2-ethoxy ethanol at a temperature of 120–125° C. The whole is stirred for 2 hours at this temperature whereupon the solution becomes dark blue coloured. The dyestuff formed of the formula

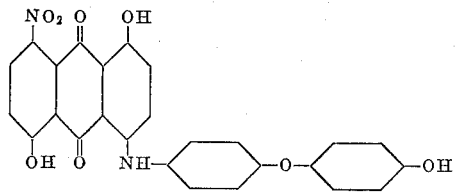

precipitates on adding 500 parts of methanol at 60° and stirring for 4 hours at room temperature as a fine dark violet-blue crystal powder. The yield is almost quantitative. It is filtered off and dried. Recrystallised from chlorobenzene, the product melts at 247–248°. It dissolves in concentrated sulphuric acid with a dark green and in pyridine and in a mixture of xylenes it dissolves with a blue colour.

The finely distributed dyestuff dyes polyester fibres from an aqueous dispersion in very fast clear blue shades. The dyeings on polyglycol naphthalate fibres have excellent fastness to sublimation.

EXAMPLE 2

A mixture of 33 parts of 1,5-dihydroxy-4,8-dinitroanthraquinone and 58.4 parts of 4-amino-3,5-dimethyl-4'-hydroxy-diphenyl ether is stirred at room temperature with 550 parts of distilled nitrobenzene. The whole is heated for 20 hours 180–185° in a sloping condenser while stirring well and using nitrogen as propellant gas. The nitrobenzene is then substantially distilled off in vacuo and the residue is stirred with methanol whereupon the dyestuff of the formula

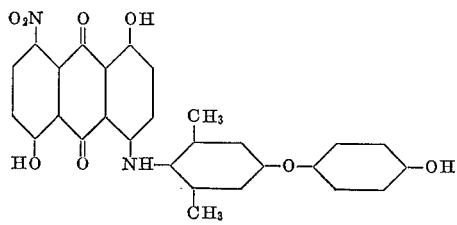

precipitates. By repeated recrystallization from n-butanol the dyestuff is obtained in a pure form as a dark, shimmering crystal powder. It dissolves in concentrated sulphuric acid with a blue and in pyridine or a mixture of xylenes with a reddish blue colour. The dyestuff is milled with sodium dodecylbenzene sulphonate when it then dyes polyglycol terephthalate fibres in clear reddish blue shades from an aqueous dispersion in the presence of carriers such as phenylphenol. The dyeings have very good fastness to light, sublimation and industrial fumes.

The same compound can also be prepared as follows:
A mixture of 33 parts of 1,5-dihydroxy-4,8-dinitroanthraquinone and 60.7 parts of 4-amino-3,5-dimethyl-4'-methoxy-diphenyl ether and 500 parts of ethylene glycol monoethyl ether is stirred at room temperature in a vessel fitted with a sloping condenser. The mixture is then heated under an atmosphere of nitrogen while stirring vigorously for 40 hours at 135–140°. The ethylene glycol monoethyl ether is then distilled off in vacuo, the residue is stirred with methanol, filtered off under suction and dried. In this way, 52.6 parts of a dark blue powder are obtained. This is pasted in 700 parts of 30% aqueous pyridine, 11.8 parts of sodium hydrogen sulfide are added at 40°, the temperature is raised to 90–98° while stirring well and the whole is kept for 2 hours at this temperature. On diluting with 500 parts of water, the reduced dyestuff separates out as a dark blue precipitate. It is filtered off under suction, dried and re-crystallized from pyridine. The pure dyestuff melts at 252–253°.

10 parts of the crystallized dyestuff base so obtained and 150 parts of concentrated hydrogen bromide solution are heated for 24 hours in a sealed glass tube at 110–115°.

The tube is then opened. The precipitated dyestuff is the same as that formulated above.

EXAMPLE 3

33 parts of 1,5-dihydroxy-4,8-dinitroanthraquinone and then 55.34 parts of 4-amino-4'-hydroxy-diphenyl thioether are added at room temperature to 550 parts of nitrobenzene. The mixture is heated to 180–185° within half an hour while stirring well and simultaneously a weak stream of nitrogen is directed over the surface of the solution. The whole is stirred for another hour at this temperature and then the nitrobenzene is substantially distilled off under reduced pressure. On stirring the residue with methanol, the dyestuff of the formula

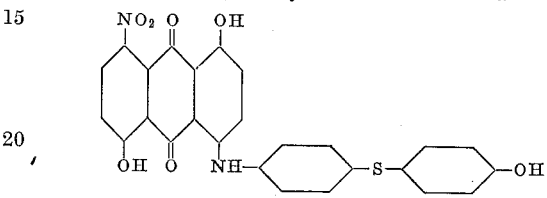

precipitates almost quantitatively. After recrystallisation from chlorobenzene, the violet blue crystals melt at 229–230°. The dyestuff dissolves in concentrated sulphuric acid with a green blue and in pyridine and a mixture of xylenes with a blue colour. It dyes polyester fabric from an aqueous dispersion in greenish blue shades which have excellent fastness to light, wet and, above all, sublimation.

EXAMPLE 4

33 parts of 1,5-dihydroxy-4,8-dinitroanthraquinone and 54.83 parts of 2-amino-4-methoxy-diphenyl ether in 500 parts of nitrobenzene are heated for 3 hours at 180–185° in a sloping condenser under an atmosphere of nitrogen while continuously stirring. The nitrobenzene is then substantially distilled off under vacuum and the residue is rubbed with 400 parts of methanol. The dark precipitate is filtered off under suction and, after drying, 47.31 parts of a dark blue powder are obtained.

This is pasted in 700 parts of 30% aqueous pyridine; 72 parts of pulverised crystallised sodium sulphide are added at 40°, the temperature is slowly raised to 90–95° while stirring well and this temperature is maintained for 4 hours.

On diluting with 500 parts of water, the dark blue dyestuff of the composition

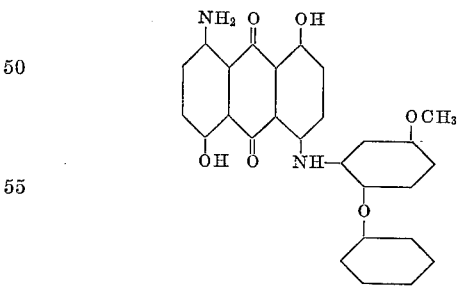

is quantitatively precipitated. It is purified by crystallisation from n-amyl alcohol: dark violet blue fine crystals which melt at 150–151°; in concentrated sulphuric acid they dissolve with a green and in pyridine and a mixture of xylenes they dissolve with a blue colour. The dyestuff dyes polyester fibres from aqueous dispersion in very fast clear and deep reddish blue shades.

EXAMPLE 5

51.26 parts of 4-amino-4'-hydroxy-diphenyl ether and 33 parts of 1,8-dihydroxy-4,5-dinitroanthraquinone are thoroughly mixed and added at room temperature to 450 parts of nitrobenzene. The whole is stirred for 1½ hours under an atmosphere of nitrogen at 180–185° whereupon the solution becomes dark blue coloured.

The solvent is substantially distilled off under reduced pressure, the residue which solidifies in brittle form is pulverised, well rubbed with 600 parts of methanol and then filtered off.

In this way, the dyestuff of the formula

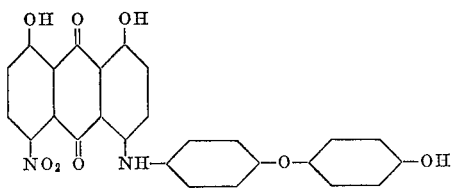

is obtained in good yield and purity. It can be further purified by crystallisation from chlorobenzene. The violet-blue crystals so obtained melt at 224–226°; they dissolve in concentrated sulphuric acid with a green-yellow and in pyridine and a mixture of xylenes with a blue colour. The dyestuff dyes polyester fibres from a fine aqueous dispersion in blue shades which have excellent light, sublimation and wet fastness properties.

EXAMPLE 6

66 parts of 4,8-dinitro-1,5-dihydroxy-anthraquinone (dinitro-anthrarufin) and 107.5 parts of 2'-methoxy-4-amino-diphenyl ether in 330 parts of nitrobenzene are heated in a weak stream of nitrogen for 2 hours at 180–185°. About 5 parts of water and 5 parts of nitrobenzene are so distilled off in a sloping condenser. The nitrobenzene is then substantially removed by distilling off in vacuo and the residue is stirred with alcohol and filtered off. On recrystallising from toluene, the product of the formula

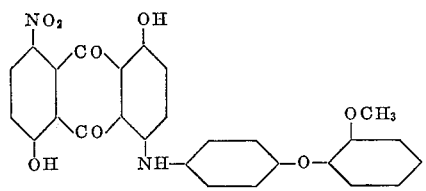

is obtained in a fairly pure form. On repeated recrystallisation from xylene, a pure product is obtained. It is in the form of dark shimmering crystals which melt at 208–210°.

The condensation can also be performed in 3000 parts of butyl alcohol. This necessitates refluxing for 24 hours and produces the same product in a very good yield. It precipitates direct from the butyl alcohol in crystallised form.

The condensation product dissolves in pyridine with a blue and in concentrated sulphuric acid with a green colour. The dyestuff dyes "Dacron" of E. I. du Pont de Nemours, U.S.A., from aqueous dispersion with the addition of o-phenylphenol and dispersing agents, in neutral blue shades which have good fastness to light and excellent fastness to sublimation.

EXAMPLE 7

49.8 parts of the dyestuff obtained according to Example 6, by condensation of 4,8-dinitro-1,5-dihydroxy anthraquinone and 2' - methoxy - 4 - amino - diphenyl ether, and 36.6 parts of ethanolamine in 500 parts of nitrobenzene are heated in a sloping condenser for 2 hours at 140–150° while stirring well and introducing nitrogen as propellent gas. The reaction mixture is then cooled to room temperature and the dyestuff which has already partly crystallised out is completely precipitated by the addition of 1000 parts of methanol. The crude dyestuff is isolated and purified by recrystallising twice from 2-ethoxy-ethanol-1.

The pure dyestuff so obtained of the formula

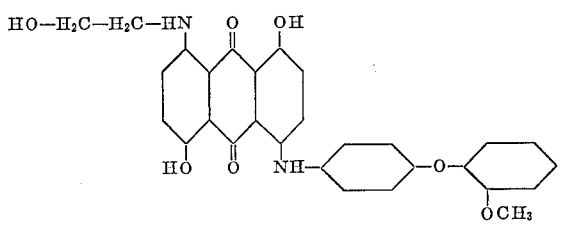

melts at 211–212.5°; it dissolves in concentrated sulphuric acid with a green and in pyridine or a mixture of xylenes with a pure blue colour. The dyestuff dyes polyester fibres from a fine aqueous dispersion in clear, blue, very fast shades. The dyeings have very good fastness to sublimation.

EXAMPLE 8

51.26 parts of 3-amino-3'-hydroxy-diphenyl ether are added to a paste of 33 parts of 1,5-dihydroxy-4,8-dinitroanthraquinone in 550 parts of nitrobenzene and the mixture is heated at 180–185° until no more starting material can be traced. A deep blue solution is obtained and after removing the greater part of the solvent by steam distillation, the condensation product precipitates. It is filtered off and reduced with sodium sulphide in aqueous pyridine as described in Example 4. In this way the dyestuff of the formula

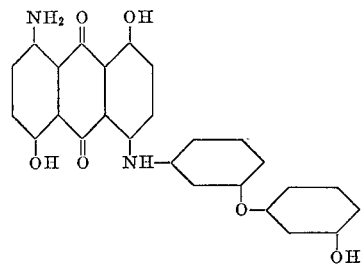

is obtained. It separates out quantitatively on diluting the solution with 600 parts of water.

After drying, it is further purified by recrystallisation from o-dichlorobenzene; it is in the form of large dark blue crystals which are sufficiently pure for analysis and melt at 208–209°. In concentrated sulphuric acid they dissolve with a green and in pyridine or a mixture of xylenes they dissolve with a blue colour. The dyestuff dyes polyester material as well as cellulose acetate fibres from a finely distributed aqueous dispersion in very clear blue shades which have excellent fastness to light, wet and sublimation.

EXAMPLE 9

Instead of using either 1,5- dihydroxy - 4,8 - dinitroanthraquinone or 1,8 - dihydroxy - 4,5 - dinitro-anthraquinone in the previous examples a mixture of these substances as described below can be used as starting material:

A mixture of different isomers of dinitro-anthraquinones consisting mainly of 1,5- and 1,8-dinitro compounds is obtained by nitrating anthraquinone. This mixture is converted with the aid of potassium hydroxide and phenol into the mixture of the corresponding diphenoxy derivatives; after again nitrating and saponifying, finally a mixture consisting mainly of 1,5-dihydroxy-4,8-dinitro-anthraquinone and 1,8-dihydroxy-4,5-dinitro-anthraquinone is formed.

33 parts of this mixture and 50.25 parts of 3-amino-4'-hydroxy-diphenyl ether in 250 parts of nitrobenzene are heated to 180–185°. After one hour, the mixture formed of dyestuffs of the formulae

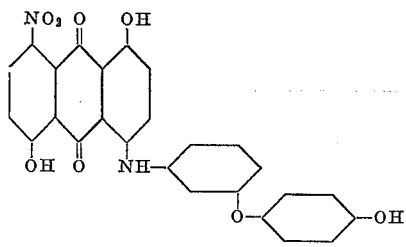

and

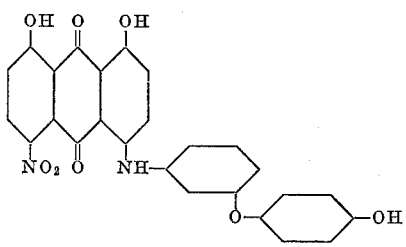

is precipitated by stirring the deep blue solution into 700 parts of cooled methanol. The precipitate is filtered off and freed from adhering nitrobenzene by washing with methanol. The dyestuff dissolves in concentrated sulphuric acid with a yellow-green and in pyridine and a mixture of xylenes with a clear blue colour. The dyestuff dyes polyester fibres in deep blue shades from a fine aqueous dispersion. The dyeings have excellent fastness properties.

EXAMPLE 10

2 parts of the finely ground dyestuff obtained according to Example 1 are dispersed in 4000 parts of water. 12 parts of the sodium salt of o-phenylphenol and 12 parts of diammonium phosphate are added to this suspension and 100 parts of a terephthalic acid polyglycol ester fabric are dyed for 1½ hours at 95–98°. The dyeing is rinsed and thoroughly washed with dilute sodium hydroxide solution and a dispersing agent. A blue dyeing is obtained which is fast to light, wet and sublimation.

EXAMPLE 11

2 parts of the finely ground dyestuff obtained according to Example 9 are suspended in 4000 parts of water which contains 2 parts of an anion-active synthetic dispersing agent. The pH of the dyebath is adjusted to 6.5 with acetic acid. 100 parts of terephthalic acid polyglycol ester fabric are introduced at 40°, the bath is heated in an autoclave within 15 minutes at 120° and the bath is kept for 45 minutes at this temperature. The dyeing is rinsed with water and soaped. In this way a clear blue dyeing is obtained which has excellent fastness to light, wet and sublimation.

The following table shows the shades of dyeings on Dacron (Du Pont de Nemours, Wilmington, Delaware, U.S.A.) attained with other dyestuffs produced by the methods described in the examples.

*Table 1*

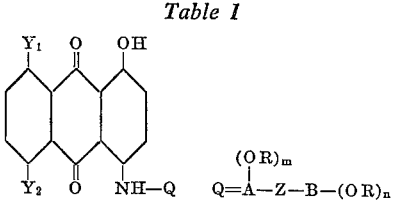

$$Q = A - Z - B - (OR)_n$$

| No. | $Y_1$ | $Y_2$ | —NH—Q | Shade on Dacron |
|---|---|---|---|---|
| 1 | $NH_2$ | OH | —NH—⟨⟩—O—⟨⟩—OH | Blue. |
| 2 | OH | $NO_2$ | —NH—⟨⟩—O—⟨⟩—OH | Do. |
| 3 | $NH_2$ | OH | —NH—⟨⟩—O—⟨⟩—OH | Do. |
| 4 | $NO_2$ | OH | —NH—⟨CH_3,CH_3⟩—S—⟨⟩—OCH_3 | Do. |
| 5 | $NO_2$ | OH | —NH—⟨OCH_3⟩—O—⟨⟩ | Do. |
| 6 | OH | $NO_2$ | —NH—⟨⟩—O—⟨⟩—OH | Do. |

*Table I*—Continued

| No. | Y₁ | Y₂ | —NH—Q | Shade on Dacron |
|---|---|---|---|---|
| 7 | NO₂ | OH | —NH—⟨⟩—O—⟨⟩—OH | Blue. |
| 8 | OH | NO₂ | —NH—⟨⟩(CH₃)(CH₃)—S—⟨⟩—OH | Do. |
| 9 | NH₂ | OH | —NH—⟨⟩—O—⟨⟩—OH | Do. |
| 10 | NO₂ | OH | —NH—⟨⟩—O—⟨⟩—OCH₃ | Do. |
| 11 | OH | NH₂ | —NH—⟨⟩—O—⟨⟩—OCH₃ | Do. |
| 12 | NO₂ | OH | —NH—⟨⟩—O—⟨⟩—OH | Do. |
| 13 | OH | NH₂ | —NH—⟨⟩—O—⟨⟩—OH | Do. |
| 14 | {NO₂ / OH} | {OH / NO₂} | {—NH—⟨⟩(CH₃)(CH₃)—S—⟨⟩—OH} Mixture 1:1 | Do. |
| 15 | NH₂ | OH | —NH—⟨⟩—O—⟨⟩—OH | Do. |
| 16 | NO₂ | OH | —NH—⟨⟩—O—⟨⟩—OCH₃ | Do. |
| 17 | NO₂ | OH | —NH—⟨⟩(CH₃)(CH₃)—O—⟨⟩—OCH₃ | Do. |
| 18 | NO₂ | OH | —NH—⟨⟩—S—⟨⟩—OCH₃ | Do. |

*Table I*—Continued

| No. | Y₁ | Y₂ | —NH—Q | Shade on Dacron |
|---|---|---|---|---|
| 19 | NO₂ | OH | —NH—⬡—O—⬡—OH | Blue. |
| 20 | NH₂ | OH | —NH—⬡—O—⬡—OCH₃ | Do. |
| 21 | NH₂ | OH | —NH—⬡—S—⬡—OH | Greenish blue. |
| 22 | OH | NO₂ | —NH—⬡(CH₃)—O—⬡—OCH₃ | Blue. |
| 23 | NH₂ | OH | —NH—⬡—O—⬡(CH₂O) | Do. |
| 24 | NO₂ | OH | —NH—⬡(CH₃O)(CH₃O)—O—⬡ | Do. |
| 25 | NO₂ | OH | —NH—⬡(OH)—O—⬡—OH | Greenish blue. |
| 26 | NO₂ | OH | —NH—⬡—O—⬡—OH | Blue. |
| 27 | NH₂ | OH | —NH—⬡—S—⬡—OCH₃ | Do. |
| 28 | OH | NO₂ | —NH—⬡—O—⬡—OCH₃ | Do. |
| 29 | NO₂ | OH | —NH—⬡—O—⬡—OCH₃ | Do. |
| 30 | OH | NO₂ | —NH—⬡(OH)—O—⬡ | Do. |
| 31 | OH | NH₂ | —NH—⬡(OCH₃)—O—⬡ | Do. |

Table I—Continued

| No. | $Y_1$ | $Y_2$ | —NH—Q | Shade on Dacron |
|---|---|---|---|---|
| 32 | $NO_2$ | OH | —NH—(C₆H₃)(OH)—O—(C₆H₅) | Blue. |
| 33 | $NO_2$ | OH | —NH—(C₆H₂)(CH₃)(CH₃)—O—(C₆H₄)—OCH₃ | Do. |
| 34 | $NH_2$ | OH | —NH—(C₆H₄)—O—(C₆H₃)(OH) | Do. |
| 35 | $NO_2$ | OH | —NH—(C₆H₄)—S—(C₆H₄)—OCH₃ | Greenish blue. |
| 36 | $NO_2$ | OH | —NH—(C₆H₄)—O—(C₆H₄)—OCH₃ | Blue. |
| 37 | $NH_2$ | OH | —NH—(C₆H₂)(CH₃)(CH₃)—O—(C₆H₄)—OCH₃ | Do. |
| 38 | OH | $NH_2$ | —NH—(C₆H₄)—O—(C₆H₄)—OH | Do. |
| 39 | OH | $NH_2$ | —NH—(C₆H₂)(CH₃)(CH₃)—S—(C₆H₄)—OH | Do. |
| 40 | $NO_2$ | OH | —NH—(C₆H₃)(OCH₃)—O—(C₆H₅) | Do. |
| 41 | OH | $NH_2$ | —NH—(C₆H₄)—O—(C₆H₃)(OCH₃) | Do. |
| 42 | $CH_3NH$ | OH | —NH—(C₆H₄)—O—(C₆H₄)—OCH₃ | Do. |
| 43 | OH | $NO_2$ | —NH—(C₆H₄)—O—(C₆H₄)—OH | Do. |

Table I—Continued

| No. | $Y_1$ | $Y_2$ | —NH—Q | Shade on Dacron |
|---|---|---|---|---|
| 44 | $NH_2$ | OH | —NH—⌬—O—⌬—$OCH_3$ | Blue |
| 45 | OH | $NO_2$ | —NH—⌬(OH)—O—⌬—OH | Greenish blue. |
| 46 | $NH_2$ | OH | —NH—⌬—S—⌬—OH | Blue. |
| 47 | $NO_2$ | OH | —NH—⌬($CH_3$, $CH_3$, $CH_3$)—O—⌬—$OCH_3$ | Do. |
| 48 | $NH_2$ | OH | —NH—⌬—O—⌬—OH | Do. |
| 49 | $NH_2$ | OH | —NH—⌬—S—⌬—$OCH_3$ | Do. |
| 50 | OH | $NO_2$ | —NH—⌬($OCH_3$)—O—⌬—$OCH_3$ | Greenish blue. |
| 51 | $NO_2$ | OH | —NH—⌬—O—⌬—$OCH_3$ | Blue. |
| 52 | {$NO_2$, OH} | {OH, $NO_2$} | {—NH—⌬—O—⌬(HO)—} Mixture 1:1 | Do. |
| 53 | $NO_2$ | OH | —NH—⌬($CH_3$, $CH_3$)—S—⌬—$OCH_3$ | Do. |
| 54 | $NH_2$ | OH | —NH—⌬(OH)—O—⌬ | Do. |
| 55 | OH | $CH_3NH$ | —NH—⌬—O—⌬—OH | Do. |
| 56 | $NH_2$ | OH | —NH—⌬—O—⌬—$OCH_3$ | Do. |

Table I—Continued

| No. | Y₁ | Y₂ | —NH—Q | Shade on Dacron |
|---|---|---|---|---|
| 57 | NO₂ | OH | —NH—⌬—OH with —O—⌬ | Blue. |
| 58 | OH | NH₂ | —NH—⌬—S—⌬—OCH₃ | Greenish blue. |
| 59 | OH | NO₂ | —NH—⌬—O—⌬—OC₂H₅ | Blue. |
| 60 | NO₂ | OH | —NH—⌬(OCH₃)—O—⌬—OCH₃ | Do. |
| 61 | NO₂ | OH | —NH—⌬(C₂H₅)(C₂H₅)—O—⌬—OCH₃ | Do. |
| 62 | OH | NH₂ | —NH—⌬(C₂H₅)—O—⌬—OH | Do. |
| 63 | OH | NH₂ | —NH—⌬—O—⌬(Cl)—OH | Do. |
| 64 | NH₂ | OH | —NH—⌬—CH(CH₃)₂ with —O—⌬—OCH₃ | Do. |
| 65 | OH | NO₂ | —NH—⌬(OCH₃)—O—⌬—C(CH₃)₃ | Do. |
| 66 | NO₂ | OH | —NH—⌬(CH₃)—O—⌬(CH₃O)—Br | Do. |
| 67 | NO₂ | OH | —NH—⌬—CH(CH₃)₂ with —O—⌬—CH₃O | Do. |
| 68 | NO₂ | OH | —NH—⌬(OCH₃)—O—⌬—C(CH₃)₃ | Do. |
| 69 | NO₂ | OH | —NH—⌬—O—⌬(Cl)—OCH₃ | Do. |
| 70 | NO₂ | OH | —NH—⌬—O—⌬(CH₃O)—Br | Do. |

What we claim is:
1. A dyestuff of the formula

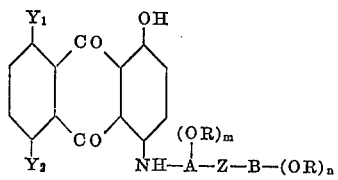

wherein of $Y_1$ and $Y_2$ one Y is the hydroxyl group and the other Y is a member selected from the group consisting of nitro, amino, mono-lower alkylamino, and hydroxy-lower alkylamino, each of A and B is independently selected from the group consisting of unsubstituted phenylene and phenylene substituted with from 1 to 3 substituents selected from the group consisting of lower alkyl and halogen of atomic number of from 9 to 35 inclusive, Z is a member selected from the group consisting of oxygen and sulfur, R is a member selected from the group consisting of hydrogen and lower alkyl, and each of $m$ and $n$ represents independently one of the integers, ranging from 0 to 2, the sum total of $m+n$ being at least one and maximally 3, and the number of —OR groups in which R is hydrogen ranging from 0 to maximally 2.

2. A dyestuff of the formula

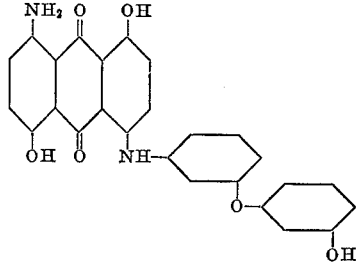

3. A dyestuff of the formula

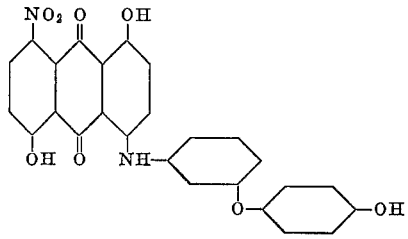

4. A dyestuff of the formula

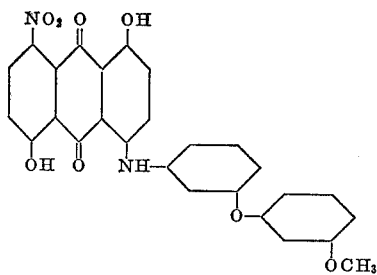

5. A dyestuff of the formula

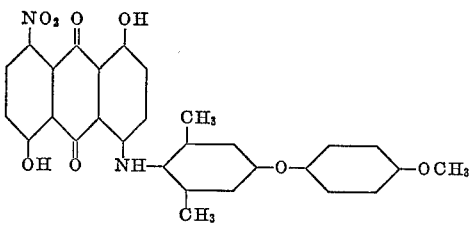

6. A dyestuff of the formula

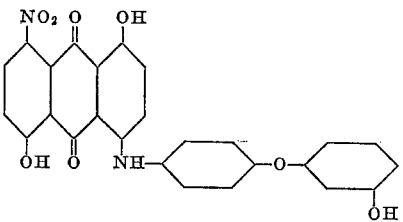

References Cited by the Examiner
UNITED STATES PATENTS

| | | | |
|---|---|---|---|
| 2,798,081 | 7/57 | Dickey et al. | 260—380 |
| 2,845,443 | 7/58 | Hindermann et al. | 260—380 X |
| 2,992,240 | 7/61 | Lodge | 260—380 |

LORRAINE A. WEINBERGER, *Primary Examiner.*
LEON ZITVER, *Examiner.*